(12) United States Patent
Kaneko

(10) Patent No.: US 7,002,680 B2
(45) Date of Patent: Feb. 21, 2006

(54) METHOD AND APPARATUS FOR MEASURING WAVEFORMS AND WAVELENGTHS OF OPTICAL SIGNALS

(75) Inventor: Yasuhisa Kaneko, Kanagawa (JP)

(73) Assignee: Agilent Technologies, Inc., Palo Alto, CA (US)

( * ) Notice: Subject to any disclaimer, the term of this patent is extended or adjusted under 35 U.S.C. 154(b) by 344 days.

(21) Appl. No.: 10/641,387

(22) Filed: Aug. 13, 2003

(65) Prior Publication Data

US 2004/0033072 A1   Feb. 19, 2004

(30) Foreign Application Priority Data

Aug. 13, 2002 (JP) .............................. 2002-235513

(51) Int. Cl.
*G01J 11/00* (2006.01)
*G01J 3/30* (2006.01)

(52) U.S. Cl. ...................... 356/308; 356/328; 356/334; 398/34

(58) Field of Classification Search ................ 356/308, 356/319, 323, 325, 326, 328, 334; 398/14, 398/34
See application file for complete search history.

(56) References Cited

U.S. PATENT DOCUMENTS

| 4,335,933 | A | | 6/1982 | Palmer |
| 4,343,532 | A | | 8/1982 | Palmer |
| 4,565,447 | A | * | 1/1986 | Nelson ....................... 356/319 |
| 4,804,266 | A | * | 2/1989 | Barshad ...................... 356/308 |
| 6,094,271 | A | | 7/2000 | Maeda |
| 6,421,179 | B1 | | 7/2002 | Gutin et al. |

FOREIGN PATENT DOCUMENTS

JP          10-148581          6/1998

* cited by examiner

*Primary Examiner*—F. L. Evans

(57) ABSTRACT

A method and apparatus for measuring characteristics of a single-wavelength optical signal constituting part of a wavelength division multiplexed (WDM) optical signal is provided. The WDM optical signal is adjustably diffracted to select the single-wavelength optical signal. An optical-to-electrical conversion is performed. An electrical sampling signal representing the selected single-wavelength optical signal is generated by one of (a) optically sampling the selected single-wavelength optical signal to generate an optical sampling signal on which the optical-to-electrical conversion is performed, and (b) electrically sampling an electrical signal generated by performing the optical-to-electrical conversion on the selected single-wavelength optical signal.

20 Claims, 5 Drawing Sheets

METHOD AND APPARATUS FOR MEASURING WAVEFORMS AND WAVELENGTHS OF OPTICAL SIGNALS

TECHNICAL FIELD

The present invention relates generally to the measurement of optical signals, and more particularly to a method and apparatus for measuring optical signals together in time and frequency domains.

BACKGROUND ART

In recent years, largely due to the increasing popularity of the Internet, there has been an abrupt expansion in the volume of communications. This has stimulated improved methods for increasing the capacity of communications channels. One such method is time division multiplexing ("TDM"), in which information from several communication signals can share the same transmission channel. To do so, the bits for each signal are assigned to individual time slots or time periods that repeat or rotate so quickly that each signal has enough of the time slots to transmit all of its own information. When the information stream is received, the individual information signals are then separated based upon the assignments of each signal to its own repeating time periods or slots. The term "time division" thus refers to the time being divided into these many discrete time periods.

Another technology for increasing the capacity of communications channels is wavelength division multiplexing ("WDM"). WDM assigns the information signals to various different wavelengths (or colors) that are then separated at the receiver to recover the individual signals.

For the highest communication capacity, TDM and WDM are combined. For example, a standard communications protocol using both TDM and WDM currently employs 160 WDM channels, each channel carrying a 10 gigabits per second "(Gbps)" TDM signal. All this information is then carried by a single fiber, which may be part of a fiber optical cable.

To maintain the quality of information transmission networks, it is important to be able to analyze such multiplexed signal waveforms. This requires measuring both the wavelength spectrum ("frequency domain") and the signal modulation as a function of time ("time domain"). Typically, optical spectrum analyzers are used to measure the wavelength spectrum, and sampling oscilloscopes are used to measure the signal as a function of time.

Optical spectrum analyzers are typically constructed so that the input signal light is reflected by a diffraction grating that separates the individual multiplexed wavelengths from one another much the same way that a prism separates visible light into its various colors. After each individual wavelength is isolated, the wavelength of interest is directed to a detector, such as an opto-electrical conversion element, that converts the light into an electrical output. To examine the range of wavelengths present in the original signal, the wavelength that is extracted is then incremented. This is accomplished by rotating the diffraction grating so that the various wavelengths are presented, in turn, to the detector. In typical measurements of a WDM signal, an optical spectrum analyzer can accomplish such a spectral analysis in a time interval of approximately several milliseconds. This signal may then be recorded, displayed, or subjected to further processing as desired.

For measuring the information signal in the time domain, i.e., as a function of time, the light signal that is to be measured is detected by a similar opto-electrical conversion element and converted into an electrical signal. The electrical signal is passed to a sampling circuit that is controlled by a strobe circuit. The strobe circuit generates a repetitive, short duration strobe signal that instructs the sampling circuit to extract only the portion of the electrical signal that is present at each instant that the strobe signal is applied. The extracted signal then passes from the sampling circuit through an amplifier to an analog-to-digital ("A/D") converter. The resulting digital signal may then be recorded, displayed, or subjected to further processing as desired.

Due to the nature of optical signals, and in particular the extremely high information rates contained in the signals, previous techniques for performing such measurements are undesirably limited. A principal limitation is that measurements in the frequency domain and measurements in the time domain are performed separately, so that the measured signal characteristics lack simultaneity. There are also limitations with respect to the ranges of wavelengths that can be satisfactorily measured, and limitations in the optical power available for measuring the light signal as it is being processed by the measuring equipment.

For example, a previous measurement technique employs a repetitively pulsed light source that combines with the optical signal for transmission through a nonlinear optical crystal. The nonlinear crystal converts the wavelength of the WDM signal during each short time that the sampling light pulse is turned on. The converted wavelength is then separately detected and analyzed. Unfortunately, this results in limitations in the wavelength range that can be effectively measured, and also results in significant reductions in the resulting optical power of the final converted optical signal. In addition, to achieve the required frequency conversion, such previous techniques often use a special pulse laser with a high peak optical output power and a short pulse duration. However, not all WDM signals require such expensive and powerful analytical tools, in part because the large amounts of information in such WDM signals may be distributed across a large number of separate wavelength divisions.

A need therefore remains for methods and apparatus for efficiently and economically measuring wave shapes and wavelengths of optical signals of different wavelengths in a WDM system, while retaining substantially the full signal strength of each individual optical signal that is being measured.

Solutions to these problems have been long sought but prior developments have not taught or suggested any solutions and, thus, solutions to these problems have long been elusive.

DISCLOSURE OF THE INVENTION

The present invention provides a method and apparatus for measuring characteristics of a single-wavelength optical signal constituting part of a wavelength division multiplexed (WDM) optical signal. The WDM optical signal is adjustably diffracted to select the single-wavelength optical signal. An optical-to-electrical conversion is performed. An electrical sampling signal representing the selected single-wavelength optical signal is generated by one of (a) optically sampling the selected single-wavelength optical signal to generate an optical sampling signal on which the optical-to-electrical conversion is performed, and (b) electrically sampling an electrical signal generated by performing the optical-to-electrical conversion on the selected single-wavelength optical signal. This provides for measuring wave shapes and wavelengths of optical signals of different wavelengths in a WDM system efficiently and economically, while retaining substantially the full signal strength of each individual optical signal that is being measured.

Certain embodiments of the invention have other advantages in addition to or in place of those mentioned above. The advantages will become apparent to those skilled in the art from a reading of the following detailed description when taken with reference to the accompanying drawings.

BEST MODE FOR CARRYING OUT THE INVENTION

Figure 1:
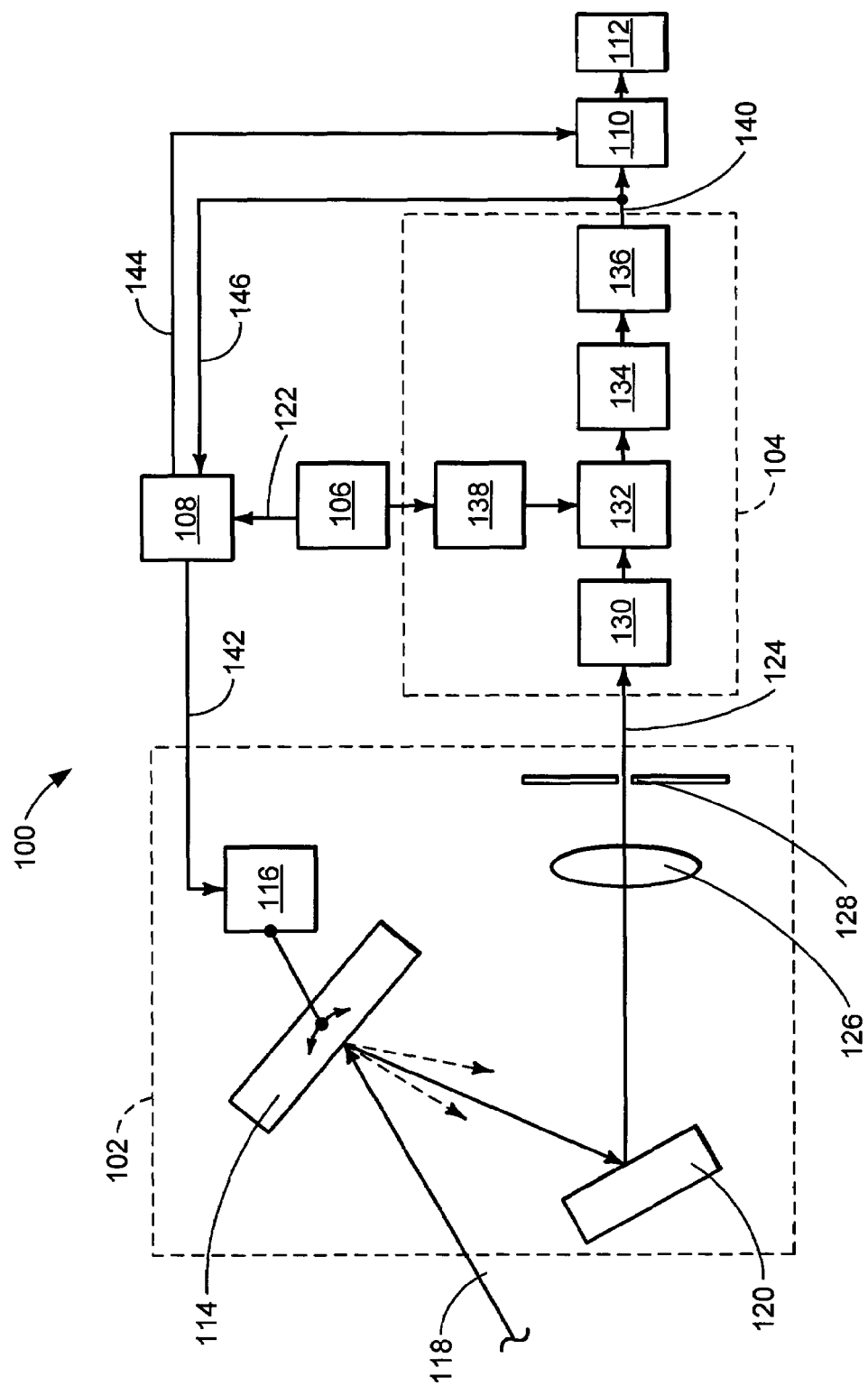
FIG. 1 is a schematic block diagram of a waveform measuring device according to the present invention.

In the following description, numerous specific details are given to provide a thorough understanding of the invention. However, it will be apparent that the invention may be practiced without these specific details. To avoid obscuring the present invention, some well-known circuits and system configurations are not disclosed in detail. Likewise, the drawings showing embodiments of the apparatus are semi-diagrammatic and not to scale. In addition, where multiple embodiments are disclosed and described having some features in common, for clarity and ease of illustration and description thereof like features one to another will ordinarily be described with like reference numerals.

Unlike previous devices in which time domain and frequency domain waveform measurements are performed separately rather than together, the present invention provides a waveform measuring method and apparatus that can perform these measurements together and without undue cost or complexity.

Previous designs, for example, have employed technologies such as sampling pulse lasers and nonlinear optical crystals to deconvolve the wavelength division multiplexed ("WDM") light signals. This can entail not only considerable complexity and expense, but the spectral conversion that is involved can produce significant and undesirable reductions in the signal-to-noise ("S/N") ratio.

In one previous design, the WDM light signal that is to be measured and analyzed and a sampling pulse light signal from a sampling pulse light source are spatially overlapped in a light combiner. The combined light signal is then passed through a nonlinear optical crystal, resulting in sum frequency and difference frequency light signals in addition to the original frequency light signals. These various light signals are then passed through a fundamental wave rejection filter that allows only the sum optical frequency to pass.

The sum optical frequency is then passed through a wavelength tunable filter to a light receiver where it is converted into an electrical signal for further processing. Individual wavelengths from the original WDM light signal are then selected by adjusting the wavelength tunable filter. In a similar implementation, an optical diffraction grating and a light receiving array are utilized in lieu of the wavelength tunable filter.

However, as suggested, there are limitations that result from using a nonlinear optical crystal to generate a sum frequency signal among multiple wavelengths and then isolating the sum frequency signal using a fundamental wave rejection filter or an optical diffraction grating. One such limitation is the somewhat limited optimal wavelength range for the generation of sum frequency light by a non-linear optical crystal. Additionally, the wavelength range that can be arbitrarily passed through a wavelength tunable filter can be limited. Ordinarily, typical ranges are approximately 50 to 100 nm, which may not be a sufficient wavelength range for measurement of a typical WDM spectrum.

Further disadvantages of such previous designs include the need for specialized pulse lasers that have a high peak optical output power and a short pulse duration for the sum frequency generation. Such lasers, although needed for the sum frequency generation, are actually more appropriate for directly observing the waveforms of extremely high-speed optical signals. However, in a typical WDM signal the individual modulation rates of the discrete optical signals that are multiplexed therein are not as high. In fact, the sampling time of such a pulse laser/sum frequency generation technique may be so short that the efficiency of the system is adversely impacted.

Similarly, such previous designs are less than optimal not only for the observation of wave shapes, but also for the observation of the spectral distribution of the WDM signals. Thus, to observe the spectra, the sum frequency light signal from the non-linear optical crystal is observed and treated as if it were in fact the light itself that is to be measured. However, the conversion in the nonlinear optical crystal significantly reduces the optical power of the sum frequency light compared to the original optical power of the light to be measured. This results in a reduction in the S/N ratio in the spectral observation, causing an unavoidable and adverse reduction in the throughput. As a result, depending upon the wavelength interval and the signal modulation rate, accurate sampling and analysis of the waveform can be degraded.

The present invention resolves these problems. Thus, referring now to FIG. 1, therein is shown a schematic block diagram of a waveform measuring device 100 according to the present invention. The waveform measuring device 100 includes a wavelength selector such as a wavelength selecting module 102, a sampler such as a sampling module 104, a pulse generator 106, a control circuit 108, and optional output information handling peripherals such as, for example, a memory device 110 and a display device 112. These may be separately supported and housed, or may be combined onto one or more chassis and located within one or more common housings, as may be suitable for the application at hand.

A wavelength division multiplexed (WDM) optical signal is composed of more than one single-wavelength optical signal of mutually different wavelengths, and the single-wavelength optical signals are individually modulated with respective information signals. The wavelength selecting module 102 selects the individual single-wavelength optical signals to be measured from the WDM optical signal. The sampling module 104 detects and samples the selected single-wavelength optical signals. The pulse generator 106 generates pulse signals used by the sampling module 104 to regulate and synchronize its sampling, and by the control circuit 108 to synchronize its control function as well. The waveform measuring device 100 is thus constructed in a modular fashion so that the WDM optical signal that is to be measured is first adjustably diffracted to select the single-wavelength optical signal therefrom in the wavelength selecting module 102. The sampling of the selected single-wavelength optical signal is then performed in a subsequent stage.

The wavelength selecting module 102 contains a diffraction grating 114 that is angularly adjustable and can be pivoted by a rotation mechanism 116 to control the angular orientation of the diffraction grating 114. A WDM optical signal 118, which contains the single-wavelength optical signals to be measured, is then directed to and is incident upon the diffraction grating 114. The diffraction grating 114 diffracts and reflects the single-wavelength optical signals to be measured at angles that are dependent upon the respective wavelengths of the individual single-wavelength optical signals in the WDM optical signal 118. Then, knowing the reflection angles of the single-wavelength optical signals of interest, a reflector 120 is appropriately disposed and positioned with respect to the diffraction grating 114 to receive reflected light of one or more of those particular single-wavelength optical signals.

To scan through the wavelengths of several of the single-wavelength optical signals of the WDM optical signal, the angle of the diffraction grating 114 is then appropriately adjusted by the rotation mechanism 116 under the control of the control circuit 108. The control circuit 108, in turn, receives a synchronization signal 122 from the pulse generator 106. As will be described in greater detail below, the pulse generator 106 controls the sampling operation of the sampling module 104 and the timing of the operation of the rotation mechanism 116 for the diffraction grating 114. The synchronization signal 122 synchronizes the functions of the control circuit 108.

The light received by the reflector 120 from the diffraction grating 114 is output as an optical signal 124 by passing it through a lens 126 and a slit 128 toward the sampling module 104. The precise wavelength resolution of the wavelength selecting module 102 is adjusted by adjusting the width of the slit 128. The angularly adjustable diffraction grating thus provides for selecting a single-wavelength optical signal from the incident WDM optical signal by adjustably diffracting the incident WDM optical signal to reflect the selected single-wavelength optical signal as an optical output signal.

The sampling module 104 includes an optical-to-electrical converter 130, a sampling circuit 132, an amplifier 134, and an analog-to-digital ("A/D") converter 136, connected sequentially in this order. A strobe circuit 138 is connected to control the sampling operation of the sampling circuit 132 in response to pulse signals received from the pulse generator 106.

The optical signal 124 that is input into the sampling module 104 from the wavelength selecting module 102 is converted into an electrical signal by the optical-to-electrical converter 130. This electrical signal is then electrically sampled at intervals in the sampling circuit 132 according to the strobe signal provided by operation of the strobe circuit 138. For example, an extremely short duration strobe signal may be generated by the strobe circuit 138 and the sampling in the sampling circuit 132 will then be performed by extracting a sampled electrical output signal at the short duration instant that the strobe signal is incident on the sampling circuit 132. The sampled electrical output signal, which represents the selected single-wavelength optical signal, is then amplified by the amplifier 134, converted into a digital signal in the A/D converter 136, and output from the sampling module 104 to the memory device 110 as a digital output signal 140 that digitally represents the selected single-wavelength optical signal.

Together, the wavelength selecting module 102 and the sampling module 104 thus constitute a wavelength selector and a sampling optical-to-electrical converter that select the single-wavelength optical signal and convert it into an electrical sampling signal representing the selected single-wavelength optical signal.

The control circuit 108 provides a rotation control signal 142 that controls the rotation mechanism 116 for positioning the diffraction grating 114. The control circuit 108 also provides an angle data output 144 that provides angle information to the memory device 110. The angle data output indicates the instantaneous position of the diffraction grating 114. For synchronization or calibration of the control circuit 108, the digital output signal 140 may provide a received information reference signal 146 to the control circuit 108.

The digital output signal 140 that is output from the sampling module 104 is combined with the angle data output 144, stored in the memory device 110, and raw data and/or processed results can be displayed on the display device 112 as desired. For example, the memory device 110 may incorporate active data processing and computational functionality as appropriate to the application at hand. In one embodiment, the angle data output can then be used to derive information indicating the corresponding selected single wavelength optical signal for storage or display. In another embodiment, the memory device 110 can be configured to facilitate analysis of the digital output signal 140 when it is considered as a function of time over varied wavelengths. Other functionalities for the memory device 110, including combinations of the above, will be evident based upon the present disclosure.

In operation, the waveform measuring device 100 is thus able to obtain measured values of the WDM optical signal 118 in a matrix form on both the time domain and frequency domain axes. More specifically, the waveform measuring device 100 makes it possible to measure signal amplitudes as a function of time ("time waveforms") with respect to a number of wavelengths, and to measure wavelength spectra in a number of time periods. As a result, two-dimensional mapping for wavelength and time is possible.

Figure 2:
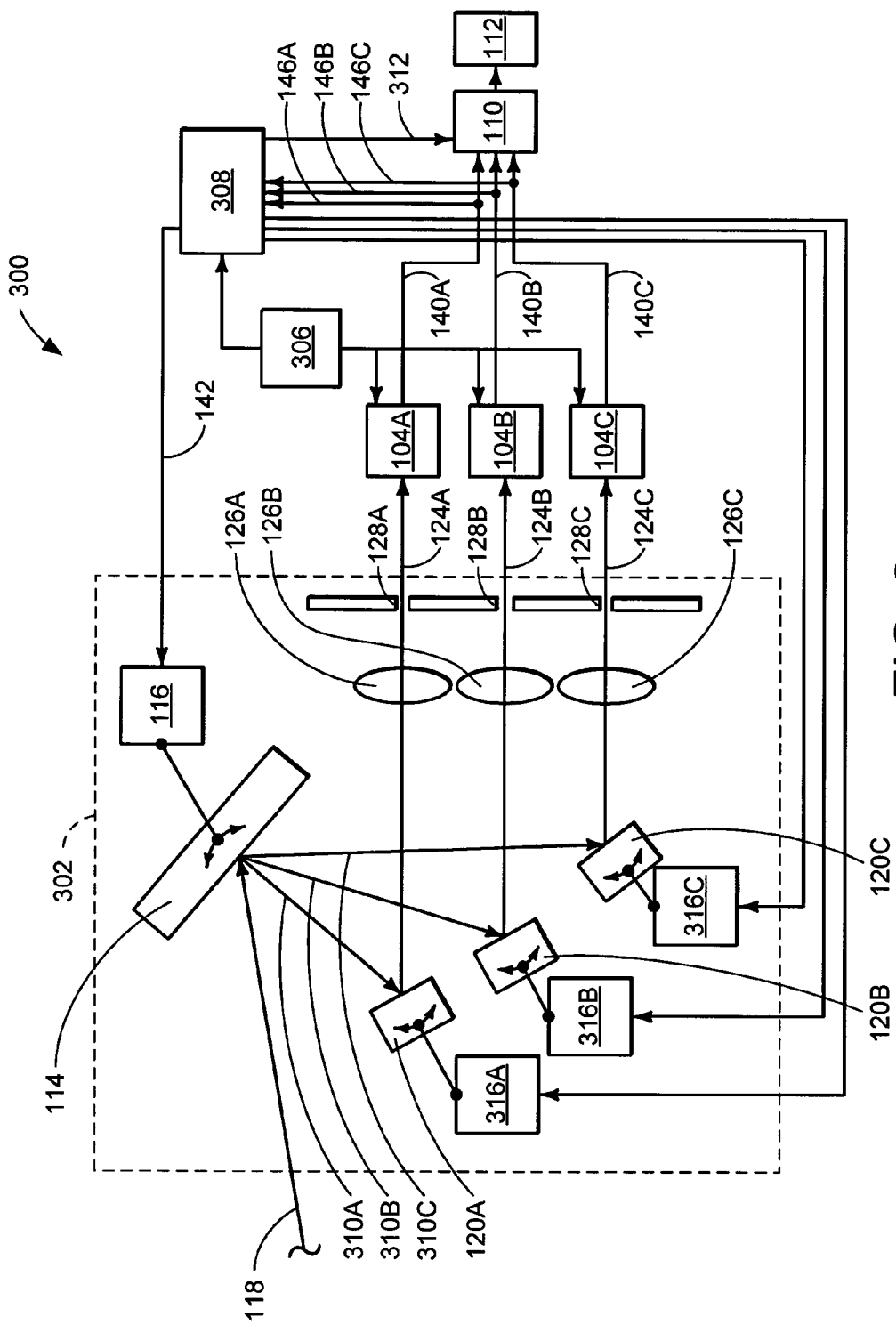
FIG. 2 is a schematic block diagram of a second embodiment of a waveform measuring device according to the present invention.

Referring now to FIG. 2, therein is shown a schematic block diagram of a waveform measuring device 300 constituting a second embodiment of the present invention.

The waveform measuring device 300 includes a wavelength selecting module that selects multiple single-wavelength optical signals and directs them individually to corresponding sampling modules, so that the wavelength selecting functions and the optical sampling functions are each operationally connected in series. Thus, the waveform measuring device 300 includes a wavelength selecting module 302 that extracts from the WDM optical signal 118 a number of single-wavelength optical signals 124A, 124B, and 124C having respective wavelengths. The waveform measuring device 300 also includes a corresponding number of sampling modules 104A, 104B, and 104C, each substantially the same in construction and function as the sampling module 104 (FIG.1). The sampling modules 104A, 104B, and 104C sample and detect the selected single-wavelength optical signals 124A, 124B, and 124C under the control of a pulse generator 306, and provide respective digital output signals 140A, 140B, and 140C. The digital output signals 140A, 140B, and 140C are electrical sampling signals representing the respective selected single-wavelength optical signals. A control circuit 308, similar in function to the control circuit 108 (FIG. 1) is also provided, as illustrated.

The waveform measuring device 300 is thus similar to the waveform measuring device 100 (FIG. 1), except that the waveform measuring device 300 is constructed so that more than one single-wavelength optical signal at a time can be individually selected by the diffraction grating 114 from the WDM optical signal 118 in parallel and at the same time.

As more specifically illustrated in FIG. 2, the waveform measuring device 300 utilizes the fact that the single-wavelength optical signals of different wavelengths show different diffraction angles when diffracted by the diffraction grating 114, thereby separating the WDM optical signal into its constituent single-wavelength optical signals at different diffraction angles so that the single-wavelength optical signals can then be individually measured simultaneously. As shown, the several light beams 310A, 310B, and 310C are each diffracted from the diffraction grating 114 at a respective different diffraction angle. Respective reflectors 120A, 120B, and 120C are then positioned to be in the paths of and to individually intercept the respective light beams 310A, 310B, and 310C.

The reflection angles of the reflectors 120A, 120B, and 120C are optionally individually rotatably adjusted and calibrated by respective rotation mechanisms 316A, 316B, and 316C under the control of the control circuit 308 to individually adjust and output their respective single-wavelength optical signals 124A, 124B, and 124C through respective lenses 126A, 126B, and 126C, and slits 128A, 128B, and 128C. Accordingly, the waveform measuring device 300 has the advantage of increased information throughput and the ability to measure the time domain and frequency domain (time response and wavelength spectrum) of the optical information signals at a number of wavelengths, simultaneously and in real time.

In a manner similar to the pulse generator 106 (FIG. 1), the pulse generator 306 transmits a synchronization signal relating to the pulse signals to the control circuit 308. Also in a manner similar to the waveform measuring device 100 (FIG. 1), the control circuit 308 uses the synchronization signal, as well as received information reference signals 146A, 146B, and 146C, to control the angular position of the diffraction grating 114 and the angular positions of the reflectors 120A, 120B, and 120C, thereby providing for precisely setting the exact variations in the wavelengths and wavelength ranges that are being extracted. This diffraction grating and reflector angle information is provided by an angle data output 312 to the memory device 110, where the raw data and/or processed results can then be stored and/or displayed on the display device 112, as previously described.

Figure 3B:
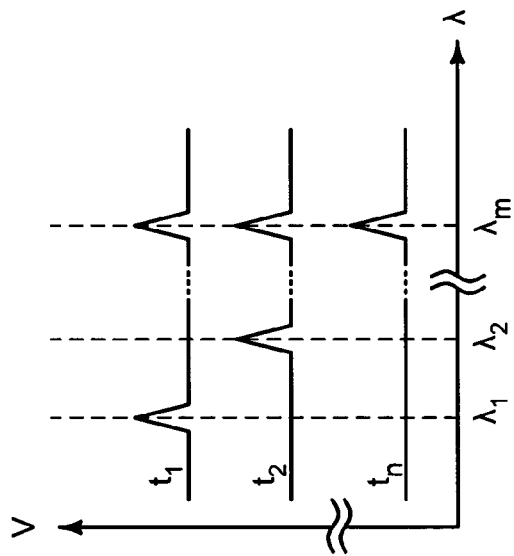
FIG. 3B is the measured signal of FIG. 3A showing the spectrum of the same signal waveform displayed on the wavelength axis.
Figure 3C:
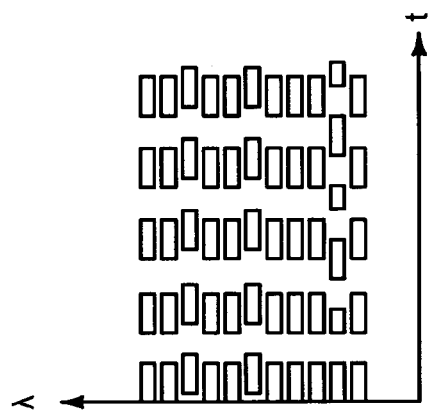
FIG. 3C is a two-dimensional map illustration with the display data of FIGS. 3A and 3B combined.
Figure 3A:
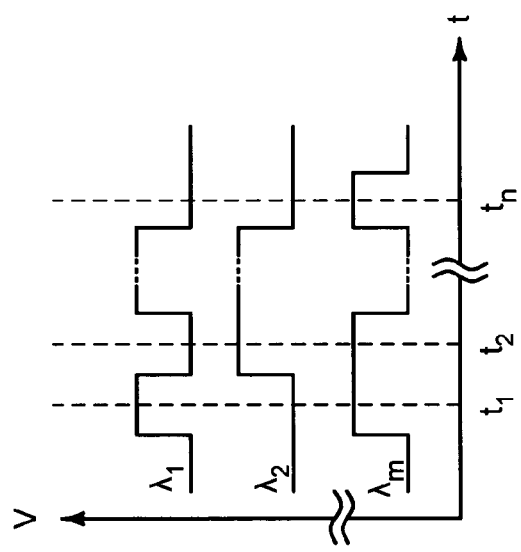
FIG. 3A is an example of a signal waveform displayed on the time axis showing the response over time of the measured signal.

Referring now to FIGS. 3A, 3B, and 3C, therein are shown examples of signal waveforms that may be displayed by the display device 112 in the waveform measuring device 300 (FIG. 2). FIG. 3A shows the response over time of the measured signal; FIG. 3B shows the spectrum of the same measured signal. Thus, FIG. 3A shows a display on the time axis; FIG. 3B shows a display on the wavelength axis. The method chosen for displaying the measured information (as functions of time, wavelength, or frequency, for example) may be selected and exchanged as desired. It is also possible to combine the display data into a two-dimensional map, as illustrated, for example, in FIG. 3C.

Figure 4:
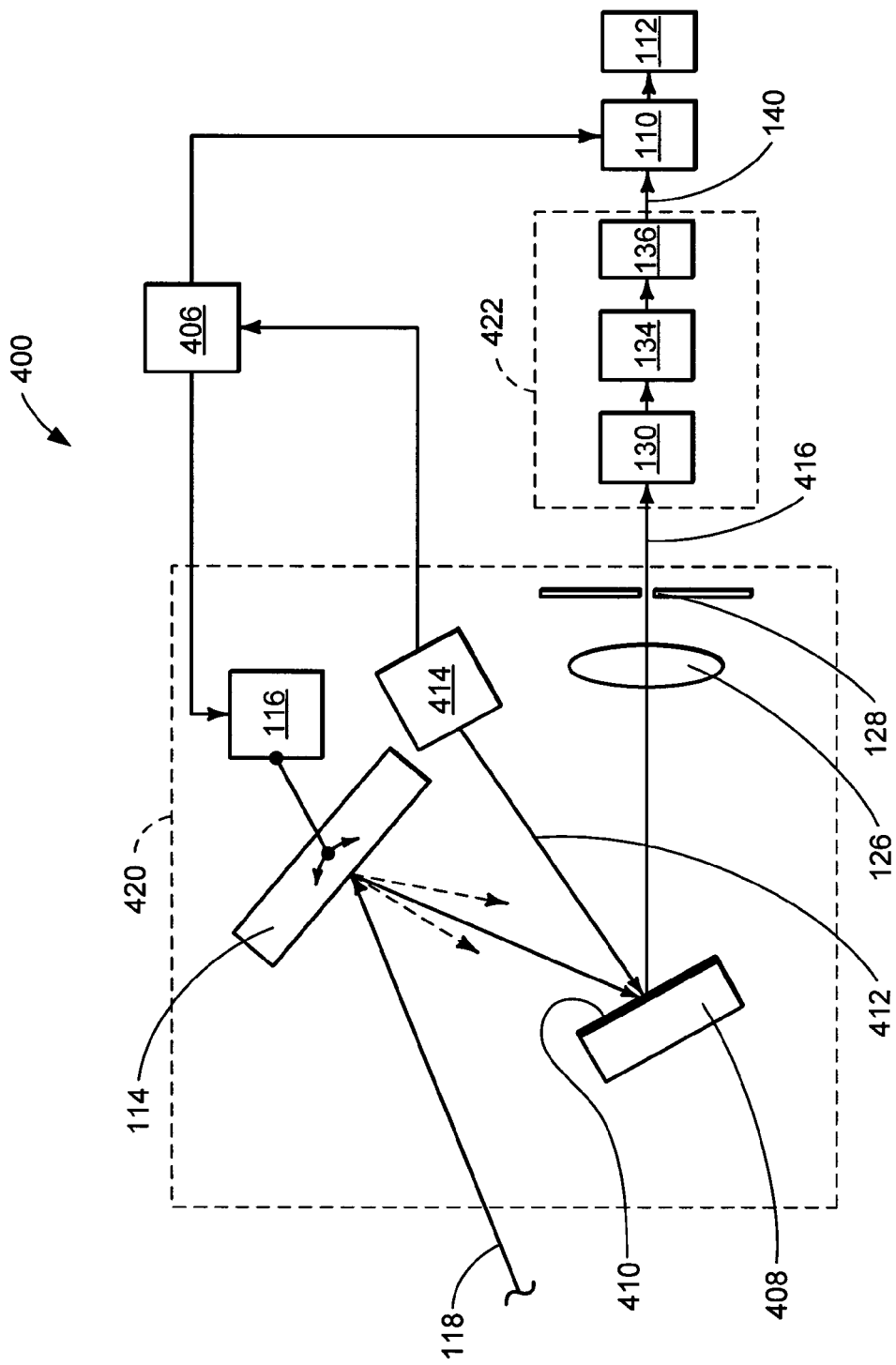
FIG. 4 is a schematic block diagram of a third embodiment of a waveform measuring device.

Referring now to FIG. 4, therein is shown a schematic block diagram of a waveform measuring device 400 constituting a third embodiment of the present invention. In this embodiment, the wavelength selection function and the sampling function occur together in a wavelength isolating/sampling module 420. The wavelength isolating/sampling module 420 thus functions as both a wavelength selector and a sampler, in which sampling is performed optically immediately following the wavelength selection. The sampled optical signal is then transmitted to an optical to electrical conversion module 422 that converts the sampled wavelength output, all under the control of a control circuit 406.

To sample the single-wavelength optical signal selected by the diffraction grating 114, a reflector 408 is positioned to receive the selected single-wavelength optical signal from the diffraction grating 114. The reflector 408 has a saturable light absorbing material 410 on its surface. The reflectivity of the reflector 408 is then modulated by a sampling pulse light beam 412 directed to the reflector 408 from a sampling light pulse generator 414.

The saturable light absorbing material 410 on the reflector 408 absorbs and does not reflect the selected single-wavelength optical signal incident upon it from the diffraction grating 114 when the selected single-wavelength optical signal is the only light incident upon the reflector 408. However, when the sampling pulse light beam 412 is also directed onto the reflector 408, the sampling pulse light beam 412 saturates the saturable light absorbing material 410 thereon. The saturable light absorbing material 410 cannot then absorb the selected single-wavelength optical signal additionally incident thereon from the diffraction grating 114. In this saturated condition, the reflector 408 then reflects the selected single-wavelength optical signal incident thereon as an output optical signal 416 that passes through the lens 126 and the slit 128. Examples of suitable materials for the saturable light absorbing material 410 include known materials such as InGaAs bulk material, and multilayered quantum well ("MQW") structures fabricated of materials such as InGaAs/InAlAs.

The output optical signal 416, generated as just described, is an optical sampling signal that is then output from the wavelength isolating/sampling module 420 and is directed to the optical-to-electrical converter 130 in the optical to electrical conversion module 422. The electrical sampling signal generated by the optical to electrical conversion module 422 in response to the optical sampling signal is then processed similarly to the electrical sampling signal in the waveform measuring devices 100 (FIG. 1) and 300 (FIG. 2).

Together, the wavelength isolating/sampling module 420 and the optical to electrical conversion module 422 thus constitute a wavelength selector and a sampling optical-to-electrical converter that select the single-wavelength optical signal and convert it into an electrical sampling signal representing the selected single-wavelength optical signal.

Based on this disclosure, it will be readily understood that a version of the waveform measuring device of FIG. 4 capable of simultaneously measuring the characteristics of multiple single-wavelength optical signals may be made in a manner similar to the way that the waveform measuring device of FIG. 2 is a multi-channel version of the waveform measuring device of FIG. 1.

Figure 5:
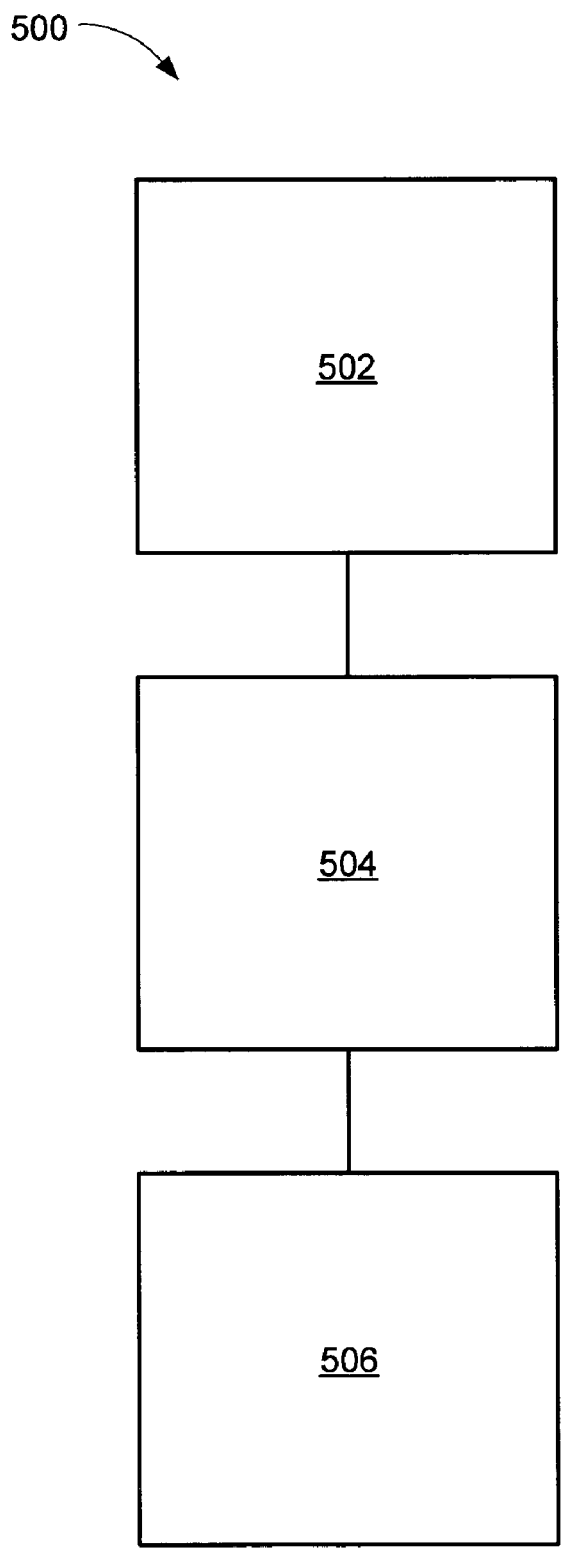
FIG. 5 is a flow chart of a method for measuring characteristics of a wavelength division multiplexed optical signal in accordance with the present invention.

Referring now to FIG. 5, therein is shown a flow chart of a method 500 for measuring characteristics of a single-wavelength optical signal constituting part of a wavelength division multiplexed optical signal in accordance with the present invention. The method 500 includes a block 502 in which the WDM optical signal is adjustably diffracted to select the single-wavelength optical signal. In a block 504, an optical-to-electrical conversion is performed. In a block 506, an electrical sampling signal representing the selected single-wavelength optical signal is generated by one of (a) optically sampling the selected single-wavelength optical signal to generate an optical sampling signal on which the optical-to-electrical conversion is performed, and (b) electrically sampling an electrical signal generated by performing the optical-to-electrical conversion on the selected single-wavelength optical signal.

It has been discovered that the present invention has numerous advantages. It can measure the time response characteristics (time domain) of a WDM optical signal waveform, and can also measure the spectrum (frequency domain) of the WDM optical signal waveform, providing wavelength selection so that only specified wavelengths from the multiple-wavelength multiplexed optical information signal are allowed to pass for optical detection. Thus, the spectrum and the time response of WDM optical signals can be easily and quickly measured.

It has been further discovered that new measurements previously not readily feasible are now possible with the present invention. In particular, these include the analysis of dynamic wavelength spectral distributions (i.e., the distribution of wavelengths over a certain period of time), as well as increased real time speed and wavelength comparison measurements.

Advantageously, the present invention also facilitates measurement of bandwidth utilization (i.e., capacity utilization) over designated time periods.

Further, relative timing relationships of the several channels in the WDM signal can be readily observed, such as confirmation that a communications control wavelength signal and other related wavelength signals have the correct timing. (FIG. 2 embodiment.) Additionally, the present invention facilitates the immediate measurement of the time wave shapes of one or a number of wavelengths, or of spectra over a single time period or a number of time periods, without requiring special changes or adjustments in the measuring equipment itself. (FIG. 2 embodiment.)

Thus, it has been discovered that the optical signal wave shape and wavelength measuring method and apparatus of the present invention furnish important and heretofore unavailable solutions, capabilities, and functional advantages for measuring and characterizing optical signal waveforms together in both the time and the frequency domains. The resulting methods and apparatus configurations are straightforward, economical, uncomplicated, highly versatile and effective, and can be based upon conventional technologies. The methods and apparatus of the present invention are thus readily suited for and fully compatible not only with existing optical communications technologies, but can be readily adapted to future technologies as well.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations which fall within the spirit and scope of the included claims. All matters hitherto-fore set forth herein or shown in the accompanying drawings are to be interpreted in an illustrative and non-limiting sense.

What is claimed is:

1. A method for measuring characteristics of a single-wavelength optical signal constituting part of a wavelength division multiplexed (WDM) optical signal, the method comprising:

adjustably diffracting the WDM optical signal to select the single-wavelength optical signal;

performing an optical-to-electrical conversion; and generating an electrical sampling signal representing the selected single-wavelength optical signal, the generating comprising one of (a) optically sampling the selected single-wavelength optical signal to generate an optical sampling signal on which the optical-to-electrical conversion is performed, and (b) electrically sampling an electrical signal generated by performing the optical-to-electrical conversion on the selected single-wavelength optical signal.

2. The method of claim 1, wherein:

adjustably diffracting the WDM optical signal comprises simultaneously selecting and individually outputting more than one of the single-wavelength optical signals; and the method additionally comprises simultaneously and in parallel converting the selected single-wavelength optical signals into respective electrical sampling signals.

3. The method of claim 2 further comprising individually adjusting the selected single-wavelength optical signals.

4. The method of claim 2 further comprising measuring the selected single wavelength optical signals simultaneously in the time domain and the frequency domain.

5. The method of claim 1 wherein optically sampling the selected single-wavelength optical signal to generate an optical sampling signal comprises directing the selected single-wavelength optical signal and a sampling pulse light beam onto a saturable light absorbing material.

6. A method for measuring characteristics of a single-wavelength optical signal constituting part of a wavelength division multiplexed (WDM) optical signal, the method comprising:

angularly adjustably diffracting the WDM optical signal to select the single-wavelength optical signal and provide angle data related thereto;

deriving wavelength information from the angle data;

performing an optical-to-electrical conversion;

generating an electrical sampling signal representing the selected single-wavelength optical signal, the generating comprising one of (a) optically sampling the selected single-wavelength optical signal to generate an optical sampling signal on which the optical-to-electrical conversion is performed, and (b) electrically sampling an electrical signal generated by performing the optical-to-electrical conversion on the selected single-wavelength optical signal; and storing the wavelength information and the electrical sampling signal.

7. The method of claim 6, wherein:

the angularly adjustably diffracting the WDM optical signal comprises simultaneously selecting and individually outputting more than one of the single-wavelength optical signals; and the method additionally comprises simultaneously and in parallel converting the selected single-wavelength optical signals into respective electrical sampling signals.

8. The method of claim 7 further comprising individually adjusting the selected single-wavelength optical signals.

9. The method of claim 7 further comprising measuring the selected single-wavelength optical signals simultaneously in the time domain and the frequency domain.

10. The method of claim 6 wherein optically sampling the selected single-wavelength optical signal to generate an optical sampling signal comprises directing the selected single-wavelength optical signal and a sampling pulse light beam onto a saturable light absorbing material.

11. Apparatus for measuring characteristics of a single-wavelength optical signal constituting part of a wavelength division multiplexed (WDM) optical signal, comprising:
   a wavelength selector that adjustably diffracts the WDM optical signal to select the single-wavelength optical signal; and
   a sampling optical-to-electrical converter that generates an electrical sampling signal representing the selected single-wavelength optical signal by one of (a) optically sampling the selected single-wavelength optical signal to generate an optical sampling signal on which an optical-to-electrical conversion is performed, and (b) electrically sampling an electrical signal generated by performing an optical-to-electrical conversion on the selected single-wavelength optical signal.

12. The apparatus of claim 11, wherein:
   the wavelength selector adjustably diffracts the WDM optical signal to simultaneously select and individually output more than one of the single-wavelength optical signals; and
   the apparatus additionally comprises additional sampling optical-to-electrical converters that simultaneously and in parallel convert the individually output single-wavelength optical signals into respective electrical sampling signals.

13. The apparatus of claim 12 further comprising a plurality of rotatable reflectors for individually adjusting the selected single-wavelength optical signals.

14. The apparatus of claim 12 further comprising circuitry for controlling the sampling optical-to-electrical converters to measure the selected single-wavelength optical signals simultaneously in the time domain and the frequency domain.

15. The apparatus of claim 11 wherein:
   the sampling optical-to-electrical converter includes a saturable light absorbing material and a generator that generates a sampling pulse light beam; and
   the sampling optical-to-electrical converter optically samples the selected single-wavelength optical signal to generate the optical sampling signal by directing the selected single-wavelength optical signal and the sampling pulse light beam onto the saturable light absorbing material.

16. Apparatus for measuring characteristics of a single-wavelength optical signal constituting part of a wavelength division multiplexed (WDM) optical signal, comprising:
   an angularly adjustable wavelength selector that adjustably diffracts the WDM optical signal to select the single-wavelength optical signal and provide angle data related thereto;
   circuitry for deriving wavelength information from the angle data;
   a sampling optical-to-electrical converter that generates an electrical sampling signal representing the selected single-wavelength optical signal by one of (a) optically sampling the selected single-wavelength optical signal to generate an optical sampling signal on which an optical-to-electrical conversion is performed, and (b) electrically sampling an electrical signal generated by performing an optical-to-electrical conversion on the selected single-wavelength optical signal; and
   a memory for storing the wavelength information and the electrical sampling signal.

17. The apparatus of claim 16, wherein:
   the angularly adjustable wavelength selector diffracts the WDM optical signal to simultaneously select and individually output more than one of the single-wavelength optical signals; and
   the apparatus additionally comprises additional sampling optical-to-electrical converters that simultaneously and in parallel convert the selected single-wavelength optical signals into respective electrical sampling signals.

18. The apparatus of claim 17 further comprising a plurality of rotatable reflectors for individually adjusting the selected single-wavelength optical signals.

19. The apparatus of claim 17 further comprising circuitry for controlling the sampling optical-to-electrical converters to measure the selected single-wavelength optical signals simultaneously in the time domain and the frequency domain.

20. The apparatus of claim 16 wherein:
   the sampling optical-to-electrical converter includes a saturable light absorbing material and a generator that generates a sampling pulse light beam; and
   the sampling optical-to-electrical converter optically samples the selected single-wavelength optical signal to generate the optical sampling signal by directing the selected single-wavelength optical signal and the sampling pulse light beam onto the saturable light absorbing material.

* * * * *